No. 827,569. PATENTED JULY 31, 1906.
H. R. ROCKWELL.
VEHICLE SPRING.
APPLICATION FILED NOV. 15, 1905.
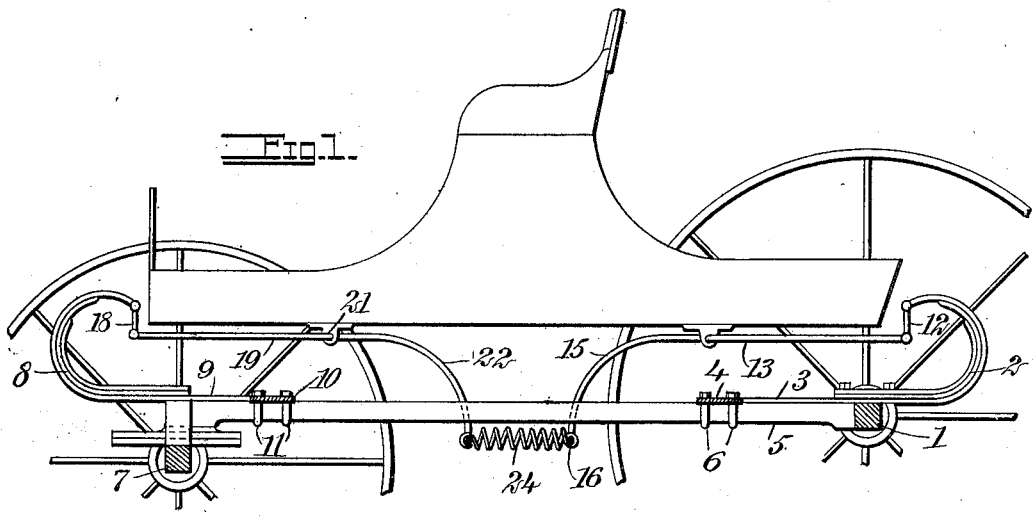
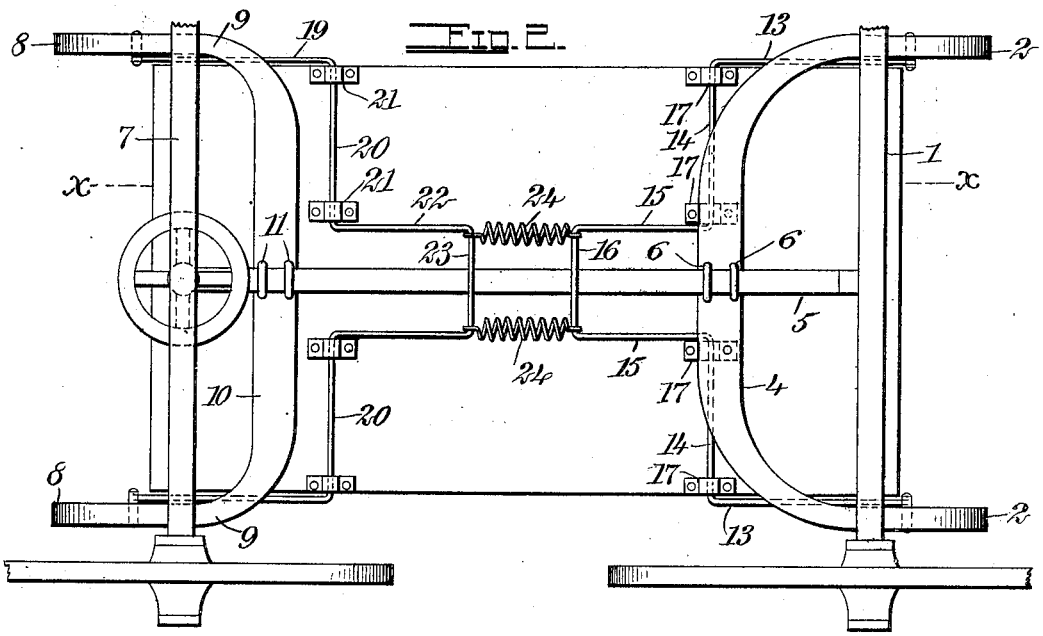
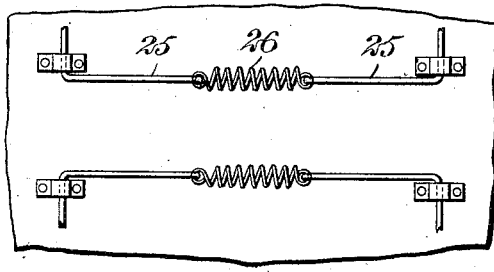
WITNESSES:
INVENTOR
Hubert R. Rockwell
BY
ATTORNEYS

UNITED STATES PATENT OFFICE.

HUBERT R. ROCKWELL, OF CHATTANOOGA, TENNESSEE, ASSIGNOR OF ONE-HALF TO JUDSON L. PRICE, OF KNOXVILLE, TENNESSEE.

VEHICLE-SPRING.

No. 827,569.         Specification of Letters Patent.         Patented July 31, 1906.

Application filed November 15, 1905. Serial No. 287,446.

*To all whom it may concern:*

Be it known that I, HUBERT R. ROCKWELL, a citizen of the United States, and a resident of Chattanooga, Hamilton county, State of Tennessee, have invented a new and Improved Vehicle-Spring, of which the following is a full, clear, and exact description.

This invention relates to improvements in springs for vehicles, the object being to provide springs that will be of strong construction with a limited amount of metal and suitable for any vehicle from a baby-carriage to an automobile, springs in which the load will be equalized on the springs and evenly distributed on the running-gear, and springs which will at all times maintain the vehicle-body on a parallel plane with the vehicle-axis even if the load is unevenly placed in the vehicle; further, to provide springs having a differential action, which greatly adds to the comfort of a person or persons riding in the vehicle.

Other objects of the invention will appear in the general description.

I will describe a vehicle-spring embodying my invention and then point out the novel features in the appended claims.

Reference is to be had to the accompanying drawings, forming a part of this specification, in which similar characters of reference indicate corresponding parts in all the figures.

Figure 1 is a section on the line $x$ $x$ of Fig. 2, showing a vehicle-spring embodying my invention. Fig. 2 is a bottom plan thereof, and Fig. 3 is a bottom plan showing a modification.

Mounted on the rear axle 1 of the vehicle and near the ends thereof are C-springs 2, the curves being upward and forward and consisting of a plurality of layers or leaves. The bottom leaves are extended forward, as indicated at 3, and are connected by the cross-bar 4, this cross-bar being secured to the reach 5, as here shown, by means of clips 6. Mounted on the front axle 7 are similar springs 8, the lower leaves 9 of which extend rearward and are connected by a cross-bar 10, secured to the reach 5 by clips 11. Attached by means of hangers 12 to the upper ends of the rear springs is an equalizing lever or bar consisting of side members 13, transverse members 14, and forwardly-extended members 15, connected by a cross-bar 16, the transverse members 14 being mounted to rock in bearings 17, attached to the under side of the vehicle-body.

Attached to the front spring 8 by means of hangers 18 is an equalizing bar or lever consisting of rearwardly-extended side members 19, transverse members 20, mounted to rotate in bearings 21, connected to the under side of the vehicle-body, and rearwardly-extended members 22, connected by a cross-bar 23. The cross-bars 16 23 are connected by coiled springs 24, which obviously will yield equally as load-pressure is brought to bear upon the vehicle-body. It will be noted in Fig. 1 that the portions 15 22 are curved downward, so that the springs 24 are below the plane of the reach 5. This, however, is not essential to the invention.

Referring now to Fig. 3, a single lever or rod 25 is extended from the front and rear springs of a side, and the ends of the front and rear rods 25 are connected by a spring 26.

Having thus described my invention, I claim as new and desire to secure by Letters Patent—

1. The combination with a vehicle, of springs mounted on the rear and front axles thereof, each spring consisting of a plurality of leaves, lower leaves being extended inward underneath the vehicle-body and secured to the vehicle-reach, levers extended from the free ends of the springs underneath the vehicle-body and springs connecting with the adjacent or inner ends of said levers.

2. The combination with a vehicle, of springs mounted on the rear axle, springs mounted on the front axle, the said rear springs having forwardly-extended portions connected by a cross-bar attached to the vehicle-reach, the said front springs having rearwardly-extended portions connected by a cross-bar attached to the reach, levers extended from the springs underneath the vehicle-body, each lever consisting of side members, transverse members, longitudinal members connected by a cross-bar, and springs connected with the cross-bars of the rear and front levers, the said levers having pivoted connection with the vehicle-body.

In testimony whereof I have signed my name to this specification in the presence of two subscribing witnesses.

HUBERT R. ROCKWELL.

Witnesses:
WM. T. COOPER,
WM. H. BOWLING.